United States Patent [19]

Pruitt

[11] Patent Number: 5,738,305
[45] Date of Patent: Apr. 14, 1998

[54] INFLATION SYSTEM

[75] Inventor: Christopher Brian Pruitt, Phoenix, Ariz.

[73] Assignee: The B.F. Goodrich Company, Akron, Ohio

[21] Appl. No.: 393,101

[22] Filed: Feb. 22, 1995

[51] Int. Cl.[6] .............................. A62B 1/20; B65G 11/10
[52] U.S. Cl. .................. 244/137.2; 244/905; 417/348; 193/25 B; 182/48
[58] Field of Search ................................ 244/137.2, 905; 417/348, 405; 415/198.1; 193/25 R; 182/48

[56] References Cited

U.S. PATENT DOCUMENTS

| | | | |
|---|---|---|---|
| 1,066,581 | 7/1913 | Brown | 417/405 |
| 1,580,878 | 4/1926 | Dufour | 417/348 |
| 2,921,431 | 1/1960 | Sampietro | 417/405 |
| 2,985,104 | 5/1961 | Fox | 102/39 |
| 3,203,352 | 8/1965 | Schafranek | 415/198.1 |
| 3,391,642 | 7/1968 | Vymola | 417/405 |
| 3,430,921 | 3/1969 | Dewey | 417/348 |
| 3,787,010 | 1/1974 | Meranshian et al. | 244/905 |
| 3,840,057 | 10/1974 | Lesh, Jr. | 141/67 |
| 3,860,984 | 1/1975 | Fisher | 9/11 A |
| 4,434,870 | 3/1984 | Fisher | 182/48 |

*Primary Examiner*—Galen L. Barefoot
*Attorney, Agent, or Firm*—Joseph Januszkiewicz

[57] ABSTRACT

An inflation system for use in inflating an inflatable foldable escape slide or foldable container for use in evacuating personnel from an aircraft, platform or other device in cases of emergencies. The slide has a gas source such as a bottle member having pressurized fluids therein or as a solid fuel propellant which upon actuation directs pressurized fluids to a turbocharger fastened onto the escape slide or foldable container. The turbocharger has a turbine at one end of a shaft driven by the pressurized fluids to drive such shaft that has a plurality of centrifugal compressors mounted on the other end of the shaft whereby the exhaust fluids from the turbine and the pressurized gas resulting from the driving of the compressors unite to inflate the escape slides or foldable container.

18 Claims, 3 Drawing Sheets

FIG. 4
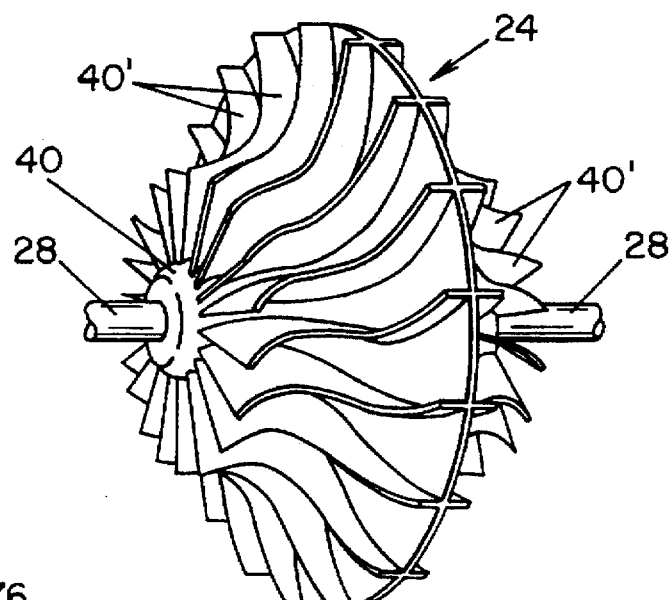
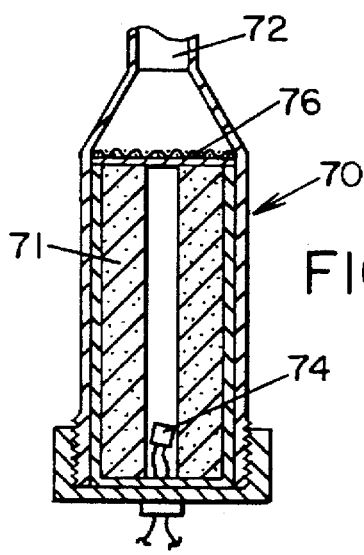
FIG. 6
FIG. 5
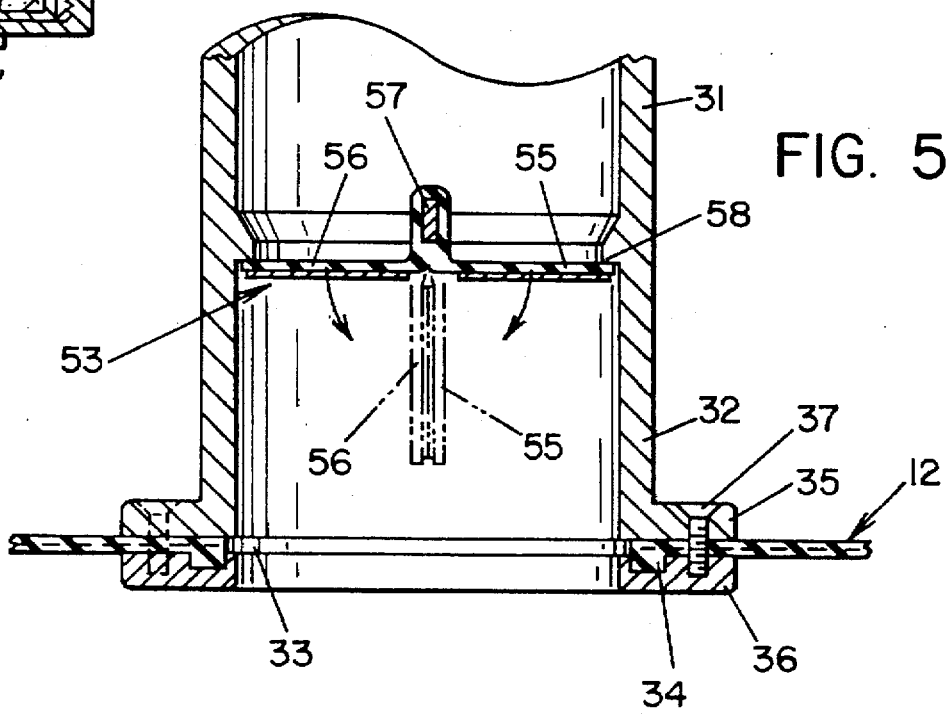

5,738,305

INFLATION SYSTEM

BACKGROUND OF THE INVENTION

This invention related to an inflation system and more particularly to a new and improved inflation system that more rapidly inflates the inflatable tubes of an escape slide for an aircraft.

Structures such as aircraft, off-shore drilling platforms and the like are equipped with inflatable evacuation escape slides and slide/rafts to facilitate the quick evacuation of persons in the event of an emergency situation. These escape slides are stored in the uninflated condition on the aircraft itself or on the device to be evacuated in a position readily available for deployment. As aircraft become larger in their capacity it has become increasingly important to provide the means to accelerate the deployment of the escape slide. The most common means to inflate these escape slides has been to use a pressurized container in conjunction with an aspirator whereby the ambient air as well as gas from the pressurized source inflate the inflatable tubes of the escape slide. The aspirator uses the principal of a venturi to aid in drawing the ambient air to help inflate the tubes. Increasing the size of the container that supplies the pressurized gas is not satisfactory as it disproportionally increases the dead weight carried by an aircraft. One solution to the problem has been during the inflation cycle, to release the stored high pressure gas at a regulated rate and direct such gas through a venturi style pump and into the inflatable tubes. The venturi style pump, which is an axial flow-type pump, draws in the secondary gas, ambient air, into the inflatable tubes with an average augmentation ratio of 2 to 1, secondary gas to primary gas respectively.

The present invention uses a turbocharger, uniquely designed to function for inflation of slides, slide/rafts, life rafts or other similar structures which provide an augmentation ratio of 4 to 1 and greater. The main advantage of the turbocharger is its higher entrainment efficiencies at high pressure ratios. The venturi style pump achieve their highest entrainment at low pressure ratios. A further advantage of the present invention is its weight savings ability as a package for the inflation system since it uses a reduced amount of needed primary gas when compared to a venturi style pump for inflating the same volume of inflatables.

SUMMARY OF THE INVENTION

The invention is directed to a inflation system for inflating an escape slide for deployment from an exit opening of an aircraft or the like wherein a gas source, such as a bottle member having pressurized fluids therein or a gas generator, which is operative upon actuation to generate pressurized fluids is mounted on the escape slide. The pressurized fluids is directed to a turbine means which drives compressor means such as centrifugal compressors, which compressor means intake ambient air and accelerate and compress the air to discharge it into the escape slide simultaneously with the discharged fluids from the turbine means to thereby augment such fluids from the turbine means.

BRIEF DESCRIPTION OF THE DRAWINGS

FIG. 4 is an isometric view of one of the centrifugal compressors used in cooperation with the turbine;

FIG. 5 is an enlarged sectional view of a portion of the inflation system showing a one-way valve for trapping the air in an escape slide after inflation of the escape slide;

FIG. 6 is a sectional view of a gas generator.

DETAILED DESCRIPTION

Figure 1:
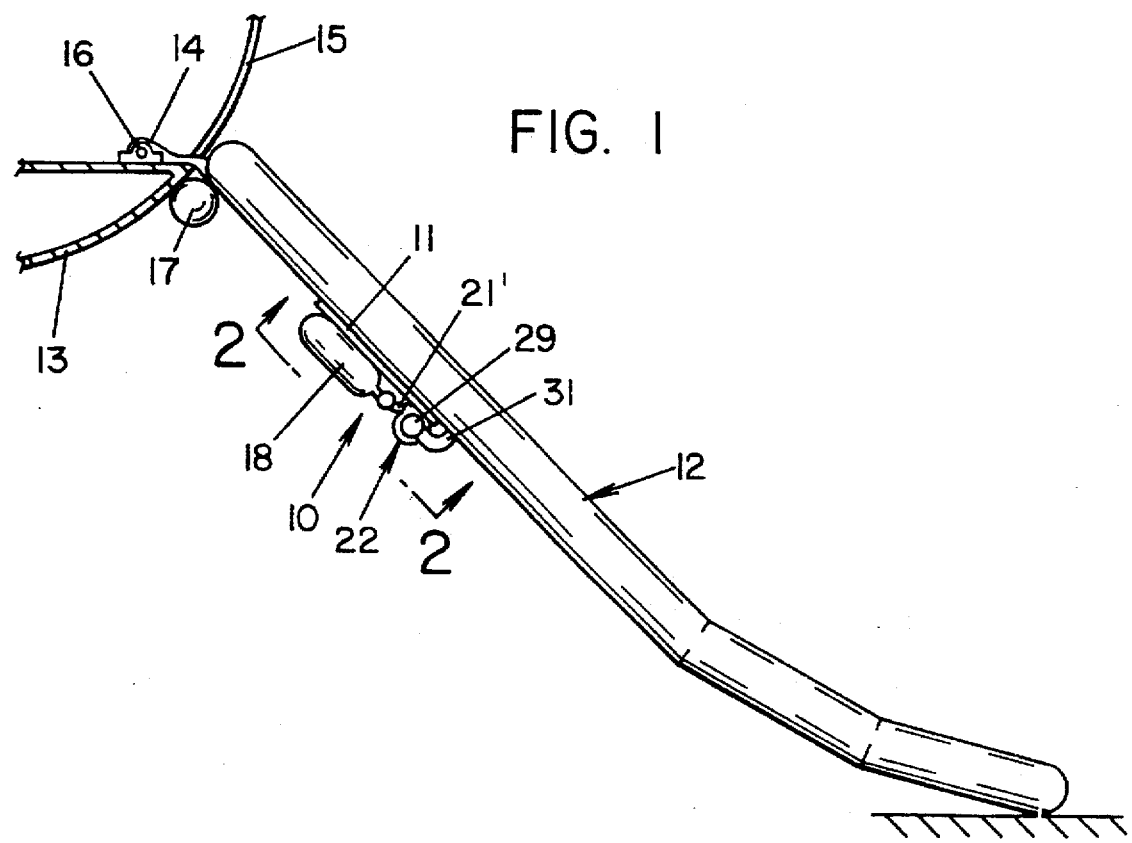
FIG. 1 is a side elevational view of an aircraft escape slide in a deployed inflated condition, with an inflation system mounted thereon and attached or mounted on an aircraft fuselage with parts of the aircraft being sectioned and broken away to more clearly disclose the invention.
Figure 2:
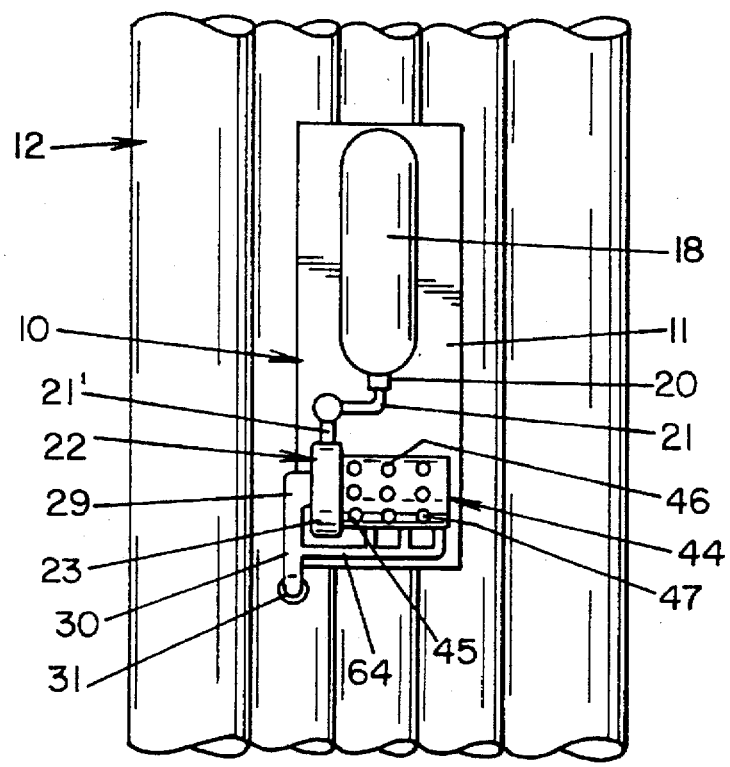
FIG. 2 is a view of the underside of the escape slide taken on line 2—2 of FIG. 1 with parts broken away to show the high pressure gas container and the turbocharger unit.

Referring now to the drawings, wherein like reference numerals designate like or corresponding parts throughout the several views, there is shown in FIG. 1 an inflation system 10 embodying the invention as mounted on a bracket 11 of an escape slide 12 or inflatable foldable container 12, which container or escape slide 12 is shown in the inflated condition as extending from an aircraft fuselage 13 to the ground. The escape slide 12 is basically a plurality of inflatable tube assemblies which are generally longitudinally extending and fastened together throughout their lengths on both sides of the slide by suitable bonding means along their common abutting surfaces and by a slide cover with a slide surface on the upper surface as is old and well known in the art. The escape slide 12 has its upper end 14 suitably fastened to the fuselage 13 adjacent to the bottom of the egress door 15 and is securely fastened thereat as by means of a girt bar 16. The attachment of the girt bar 16 to the head end of the escape slide 12 and to the aircraft structure is well-known in the art and forms no part of the invention, hence the attachment means is not further shown nor further described herein. A positioning tube 17 suitably fastened to the escape slide 12 is located at the upper end of the slide 12 to facilitate the positioning of the slide in its deployment from the aircraft.

The inflation system 10 includes a high pressure or pressurized fluid container such as a bottle/bottle member 18 mounted on the bracket 11 on the underside of the escape slide 12. The location of bracket 11 is illustrative only and can be located closer to the fuselage or other convenient location. The bottle 18 is connected via a discharge opening or a nozzle 20 to a conduit 21, which conduit 21 is suitably connected to a turbine 22 of the turbocharger unit. The turbocharger incorporates the turbine or turbine means 22 at one end and a plurality of centrifugal flow compressors or compressor means 24 at the other end to be described. Turbine or turbine means 22 has an inlet means or inlet chamber 23 suitable connected to conduit 21 via conduit 21' to provide inlet means for the pressurized air entering the turbine 22. The pressurized air impinges on the stationary vanes 19 which directs the pressurized air against the blades 25 of the gas turbine rotor or turbine wheel 26 to rotate the blades 25 and the rotor/wheel 26 which is keyed to a longitudinally extending shaft 28. The blades and rotor 26 direct the pressurized air towards a housing 29 which has an outlet means or an exhaust port 30. Exhaust port 30 is suitably connected to conduit 31 which in turn is connected to a conduit 32 which directs the pressurized air to the inflation of the tubes of the escape slide 12. The conduit 32 is mounted in an opening 33 in the escape slide 12 with a beaded edge 34 of the escape slide being clamped between a flange 35 of the conduit 32 and a circular ring 36 by screws 37 at circumferentially spaced apart locations around the end of the conduit 32.

Figure 3:
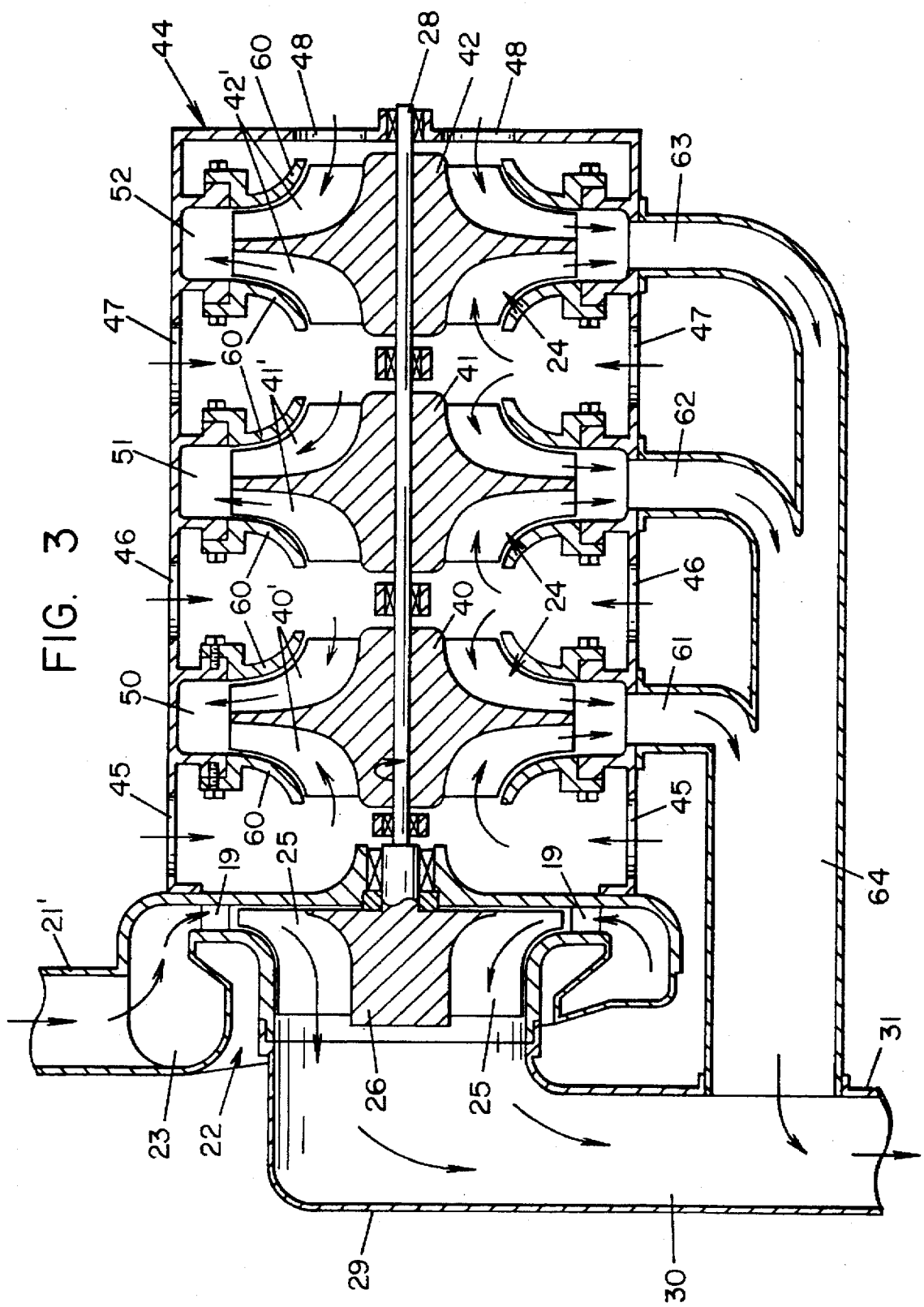
FIG. 3 is an enlarged sectional view of the turbocharger unit showing the turbine and axially aligned centrifugal compressors.

There is shown in FIG. 3, three dual entry centrifugal flow compressors or compressor means 24, wherein each compressor means 24 has a rotor, rotor disk or wheel 40, 41 and 42 suitably keyed to shaft 28 and the rotors are rotated by the output of the gas turbine 22 keyed to shaft 28. A housing 44 encompassing the compressor rotors 40, 41 and 42 is connected to the housing of the turbine 22 or is one complete housing unit with it and such housing is mounted on the bracket 11 having a plurality of inlets designated 45 through 48 in FIG. 3. The compressor rotor unit 40 (as well as unit 41 & 42) has the impeller blades 40', 41', and 42' on both sides of the rotor which operate in their rotation to move the ambient air radially outwardly to compress the gases as they exit into outer spiral channel or chamber 50 (annular chambers 51 & 52 respectively for compressor units 41 & 42). The housing 40 has suitably attached to it a plurality of annular walls 60 that are contoured to encompass the tapered radially extending impeller blades 40', 41' and 42' to provide a converging passageway as the impeller blades rotate to compress and accelerate the air towards the spiral channel or chambers 50 through 52. Air is sucked in at openings 45 through 48 and directed as indicated by the arrows in FIG. 3 to the axial openings formed by the annular walls 60 and radially outwardly into the spiral channels 50, 51 and 52. The pressurized air from the respective channel 50, 51, & 52 is directed via conduits 61, 62, 63 and 64 to exhaust port 30 and via conduits 31 and 32 to inflate the inflatable tubes of the escape side 12.

In the operation of the inflation of inflatable system 10, it is assumed that the inflation system is folded, with the escape slide 12 in the deflated condition and stored adjacent to its point of deployment. Upon actuation of the escape slide 12 from the aircraft, the escape slide unfolds with the aid of the positioning tube 17 and exposes the pressurized container bottle 18 whereupon the container 18 is opened and releases pressurized gas at approximately 3,000 pounds per square inch into turbine 22 via conduit 21. The rotor 26 and blades 25 of the turbine 22 are rotated as the pressurized gas from container 18 impinges on the blades 19 while the ambient air is drawn into the compressor units and leaves the outer portions of the centrifugal compressors via the spiral channels 50, 51 and 52 to augment the flow of the pressurized gas leaving the turbine 22. The turbocharger as described augments the primarily gas in an augmentation ratio of at least 4 to 1 (i.e. secondary gas to primary gas respectively). After the escape slide 12 has been inflated to a pressure of approximately 3 pounds per square inch, the rotation of the turbine or turbocharger 22 will substantially cease and a suitable one way valve 53 in conduit 32 will close, to trap the air in escape slide 12. Such one way valve 53 can be located in conduit 32 closely adjacent to the escape slide opening 33. Valve 53 has a pair of semi-circular flaps 55 & 56 which are resiliently mounted on a radially extending beam 57 extending across the valve opening to urge the flaps 55 & 56 to the full lines shown in FIG. 5 abutting a flange 58 projecting radially inward from the side wall of the valve opening. When the turbocharger is in operation the flaps 55 and 56 will be urged into the position shown in dot-dash lines in FIG. 5 to permit the pressurized air to be directed through conduit 32 and into the tubes of the escape slide.

With this construction a clean gas and air mixture inflates the escape slide in a matter of seconds utilizing the centrifugal fluid flow compressor which is a much smaller compact unit compared to axial flow venture style pumps. A further advantage in using the centrifugal compressor is that it is a more robust, and durable unit than the axial flow venturi style pump. Another important advantage of the turbocharger of the present invention is its high entrainment efficiencies at high pressure ratios. The venturi style pumps, which are axial flow, achieve their highest entrainment efficiencies at low pressure ratios which is not desirable for use in inflating inflatable escape slides. The increase in performance resulting from the use of a turbocharger reduces the amount of primary gas mass and volume required which significantly reduces the total weight and physical size of the inflation system.

A modification of the above described inflation system would be to use a solid fuel gas generator (FIG. 6) in lieu of the pressurized gas container or bottle 18. Broadly, the gas generator is a cartridge 70 (FIG. 6) containing a solid fuel propellant 71 comprising as an example ammonium nitrate, as the oxidant, and a solid polymeric organic compound, as the fuel or binder. The combustion gases derived from the burning of the propellant 71 by ignition of such propellant traverses through the conduit 72 which is then directed to conduit 21' in lieu of the conduit 21 from the bottle 18 to thereby drive the turbine 22 and the compressor 24 in the same manner as described above.

The propellant 71 is ignited by means of ignitor 74 which can be composed, for example of an electric match encased in a capsule of black powder and ignited by an electric current from a small battery as is old and well known in the art. Such igniting may be controlled by a remote switch suitably located at the exit door from where the escape chute or slide 12 is deployed. A suitable screen 76 may be located close to the entrance of the conduit 72.

Obviously many modifications and variations of the present invention are possible in the light of the above teachings. It is therefore to be understood, that with the scope of the appended claims, the invention may be practiced otherwise than as specifically described.

I claim:

1. An inflation system comprising an inflatable foldable escape slide for use in the evacuation of passengers in an emergency from an aircraft, an opening in said escape slide, a bottle member containing pressurized fluids mounted on said escape slide, said bottle member having a discharge opening, a housing mounted on said escape slide, a bottle member containing pressurized fluids mounted on said escape slide, said bottle member having a discharge opening, a housing mounted on said escape slide, a turbine means keyed to a central shaft for rotation in said housing, said housing cooperative with said turbine means to provide an inlet means and an outlet means for said turbine means, said outlet means being connected to said opening of said escape slide, said inlet means operatively connected to said discharge opening of said bottle member, centrifugal compressor means keyed to said central shaft for rotation in said housing, said housing having air intake means communicating with said compressor means, said housing having passageway means spaced from said inlet means of said turbine means operatively interconnecting the pressurized output of said compressor means to said opening to direct pressurized air to said escape slide to augment the pressurized fluids from said outlet means, and said turbine means via said central shaft drives said compressor means upon actuation of said bottle member to release pressurized fluids therefrom.

2. An inflation system as set forth in claim 1 wherein said compressor means is a plurality of first stage compressors.

3. An inflation system as set forth in claim 1 wherein said turbine means has impeller means for directing the pressurized fluids from said bottle member radially inwardly on said impeller means towards said outlet means to rotate said shaft means that also drives said compressor means.

4. An inflation system as set forth in claim 1 wherein said compressor means is a plurality of paired back-to-back separate compressors.

5. An inflation system as set forth in claim 4 wherein each of said back-to-back compressors are first stage centrifugal compressors.

6. An inflation system as set forth in claim 5 wherein said turbine means is provided with an impeller and radially extending blades for impingement by pressurized air at about up to 3000 pounds per square inch from said discharge opening of said bottle member.

7. An inflation system for inflating an airplane escape slide comprising an inflatable escape slide for evacuating passengers in an emergency from an aircraft, an opening in said escape slide, a power source mounted on said escape slide and operative upon actuation to provide pressurized air at 3000 pounds per square inch, a housing mounted on said slide, turbine means keyed to a central shaft in said housing, conduit means interconnecting said power source to said turbine to deliver said pressurized air directly from said power source to rotate said turbine, an air outlet opening in said housing receiving the pressurized air from said turbine, passageway means connecting said outlet opening to said opening on said escape slide for directing said pressurized air to said escape slide, centrifugal compressor means spaced axially from said turbine means and keyed to said central shaft for rotation thereby, said compressor means having a plurality of first stages only, said housing having inlet means for directing ambient air to said compressor means, outlet means in said housing for directing pressurized air from said compressor means to said passageway means to inflate said escape slide, and one way valve means mounted in said passageway means adjacent said opening to direct pressurized air from said passageway means through said opening to said escape slide.

8. An inflation system comprising an inflatable escape slide for use in the evacuation of passengers in an emergency from an aircraft, an opening in said escape slide for receiving air to inflate said escape slide, a housing mounted on said escape slide, turbine means mounted for rotation in said housing, an air inlet opening and an air outlet opening in said housing connected to said turbine means, passageway means connecting said outlet opening to said opening in said escape slide for directing pressurized air from said turbine means to said escape slides, a power source operative upon actuation to supply pressurized fluids to said inlet opening of said turbine means to drive said turbine means, centrifugal compressor means spaced axially from said turbine means and journaled in said housing for rotation solely by said turbine means, said turbine means having a plurality of radially disposed impellers that direct said pressurized fluids radially inwardly toward the central axis of said turbine means to effect rotation of said turbine means, inlet means in said housing for directing ambient air to said compressor means, outlet means in said housing for directing pressurized air from said compressor means to said opening in said escape slide to inflate said escape slide, and drive means interconnecting said turbine means to said compressor means for rotating said compressor means when said turbine means is rotated by pressurized air from said power source.

9. An inflation system as set forth in claim 8 wherein said centrifugal compressor means is a plurality of centrifugal first stage compressors and said turbine means is a centripetal turbine.

10. An inflation system as set forth in claim 9 wherein said compressor means are a plurality of paired back to back compressors.

11. An inflation system comprising an inflatable escape slide, an opening in said escape slide, a conduit being fastened to said opening, a gas source mounted on said escape slide operative upon actuation to supply pressurized gas, a housing member mounted on said escape slide, a turbine member mounted in said housing, said turbine member having a rotor with circumferentially spaced blades keyed to a shaft that extends throughout said housing, said turbine member having an inlet means, said gas source having an outlet means operative upon actuation to direct pressurized fluid to said inlet means to impinge on said blades and rotate said blades and said rotor, said rotor having vanes to direct the pressurized air from said blades into said conduit for movement into said opening of said inflatable escape slide, centrifugal compressor means mounted in said housing and keyed to said shaft for rotation therewith, said housing having air intake means for directing ambient air toward said compressor means, said compressor means having impeller means to direct said ambient air axially inwardly along lines parallel to the axis of said shaft and thence radially outwardly along said impeller to the outermost portion of said compressor means, said compressor means operative upon rotation to compress air from said air intake means and direct such pressurized air into said conduit for movement into said opening of said escape slide to pressurize said inflatable escape slide.

12. An inflation system as set forth in claim 11 wherein said centrifugal compressor means is a plurality of axially aligned centrifugal fluid flow compressors.

13. An inflation system as set forth in claim 12 wherein each centrifugal compressor has said impeller means in back to back locations to direct air from said intake means radially outwardly.

14. An inflation system as set forth in claim 13 wherein said air from said compressor means draws secondary air into said inflatable escape slide container with an augmentation ratio of over 2.5 to 1 of secondary gas to primary gas from said.

15. An inflatable system as set forth in claim 7 wherein air from said compressor means considered as secondary air to said air from said turbine considered as primary air is in the ratio of at least four to one of secondary air to primary air.

16. An inflatable system as set forth in claim 13 wherein said gas source is a bottle member containing pressurized inflating fluid, and air from said compressor means defining secondary air to said air from said bottle member defining primary air is in the ratio of at least 2.5 to 1.

17. An inflatable system as set forth in claim 13 wherein said gas source is a solid fuel propellant.

18. An inflatable system as set forth in claim 7 wherein air from said compressor means defining secondary air to said gases from said gas source considered primary gas is in the ratio of at least 3 to 1.

* * * * *